United States Patent Office 3,574,175
Patented Apr. 6, 1971

3,574,175
PREPARATION OF WATER SOLUBLE ACRYLIC COPOLYMERS FOR USE IN WATER TREATMENT
Dudley G. Woodard, Columbia City, Md., assignor to W. R. Grace & Co., New York, N.Y.
No Drawing. Filed May 22, 1969, Ser. No. 827,057
Int. Cl. C08f 15/02
U.S. Cl. 260—80.3
14 Claims

ABSTRACT OF THE DISCLOSURE

This invention relates to the preparation of copolymers of hydrochlorides of N,N-diallylglycinonitrile, N,N-diallylglycinamide and N,N-diallylglycine with acrylic acid and acrylamide. These copolymers are useful in water treatment as scale formation inhibiting agents.

---

This invention relates to copolymers of hydrochlorides of N,N-diallylglycinonitrile, N,N-diallylglycinamide and N,N-diallylglycine with acrylic acid and acrylamide. It further relates to a novel method for the preparation of these polymers. This invention also relates to the use of these novel copolymers for water treatment as scale formation inhibiting agents.

More specifically, this invention encompasses copolymers having stoichiometric sequences such as

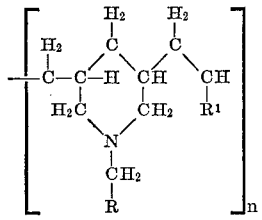

wherein R is cyano, amido, or carboxy acid, R' is amido or carboxy acid and $n$ is a postive integer of up to about 8000, as well as copolymers wherein the sequence is stoichiometric but non-repeating or of a non-stoichiometric random nature. The degree of uniformity is controlled by the molar ratio of reactants. All of these copolymers, however, contain functional pendent groups which operate to hold cations in solution, preventing the precipitation of inorganic salts in aqueous solutions.

It is the object of this invention to produce water soluble copolymers.

It is further the object of this invention to produce copolymers having functional pendent groups suitable for binding of cation values.

It is also the object of this invention to produce copolymers which exhibit threshold function for maintaining cations in solution. Substances which exhibit a threshold function are valuable in inhibiting scale formation in water systems.

More specifically, the diallyl group of the N,N-diallylglycino hydrochloride compounds of N,N-glycinonitrile hydrochloride (I), N,N-glycine hydrochloride (II), N,N-glycinamide hydrochloride (III), (I)
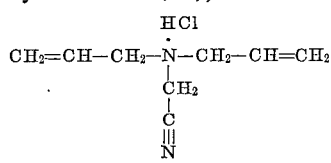

(II)
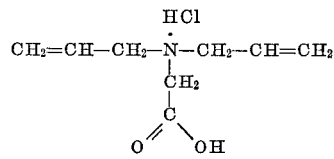

(III)
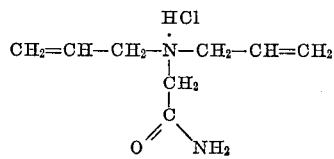

additively reacts with the unsaturated carbon-carbon bond in acrylic acid or acrylamide. Such a mode of polymerization leaves pendent functional amido, cyano and carboxy groups available for subsequent reactive or attractive binding. The presence of such groups further provides sites for possible hydrogen and chelate type bonding, thus increasing the efficiency of copolymers when used as threshold water treating agents.

Such copolymers have proven useful for their threshold function in water treatment. Substances which exhibit a threshold function when added in minor amounts to aqueous inorganic salt-containing solutions inhibit the precipitation of these salts from solution. The result is that for less than stoichiometric amounts of substance added, inorganic salts will be held in solution. This property of these copolymers is useful in water treating and processes where precipitating out of solids would impair and decrease the efficiency of the process. By adding less than 1 part of these copolymers to a solution containing up to 250 parts of dissolved inorganic salts, these salts can be maintained in solution and any precipitation inhibited. These copolymers are of particular economic value to the power plant, distillery, refinery and general process industries. The prevention of scale formation in condensers and heat exchangers leads to more efficient heat transfer and greater overall plant efficiency.

A particularly detrimental scale former is calcium carbonate. Calcium and carbonate ions are present in untreated hard water. When the solubility product concentration of these ions in water is exceeded for various reasons such as evaporation of water, change in pH or temperature, or the addition of adidtional substances, e.g., calcium ions, insoluble calcium carbonate will be formed. These carbonates will then form scales on the internal surfaces of the system. By the use of the inventive copolymers this scale formation is inhibited.

The acrylic monomers of acrylic acid and acrylamide are well known as to their properties and preparation. The N,N-diallylglycino hydrochloride monomers are prepared by the cyanomethylation of diallylamine using about stoichiometric amounts of hydrocyanic acid and formaldehyde in the presence of a mineral acid to yield the N,N-diallylglycinonitrile. This nitrile on reaction with hydrogen peroxide and water at 70° C. will yield the N,N-diallylglycinamide. On hydrolysis of the nitrile with sodium hydroxide, a sodium salt of N,N-diallylglycine is formed which is changed to the acid form by the addition of a strong acid, e.g., hydrogen chloride. The hydrochloride form of these compounds is prepared by reacting molar amounts of N,N-diallylglycino derivatives and anhydrous hydrogen chloride. This form is then used for the copolymerization reaction with acrylic acid and acrylamide.

The copolymerization is carried out in aqueous media in the presence of a free radical catalyst. Useful free radical catalyst are peroxides such as t-butyl-hydroperoxide, stearyl peroxide, lauryl peroxide or other acyl peroxides and azobis isobutyronitrile. The temperature of copolymerization may range from the temperature at which the catalyst is activated up to a temperature where the degree of acrylic monomer homopolymerization decreases the efficiency of the copolymerization. However, it is preferred that the temperature be maintained in a range of about 50° C. to about 100° C. The amount of catalyst added is dependent upon the desired molecular weight of the copolymer. As the amount of the catalyst added is increased, more sites will be activated at any one time yielding a lower molecular weight for each copolymer chain. The inverse is true as the amount of catalyst is decreased. Since in water treatment processes high molecular weight is desirable, small amount of catalyst are to be used.

The amounts of monomers added are substantially equimolar in order to produce N,N-diallylglycino hydrochlorideacrylic stoichiometric copolymers. This will produce a generally alternating structure. However, other concentrations to produce copolymers having higher amounts of either the N,N-diallylglycino hydrochloride monomer or the acrylic monomer can be produced by the present process. These may be suitably in the range from about 30 mole percent of acrylic monomer to about 70 mole percent of acrylic monomer. The use of such concentrations produces a non-stoichiometric non-alternating structure wherein there will be linkages between like monomers. Also, encompassed by the present invention is the use of mixtures of the N,N-diallylglycino hydrochloride monomers and/or the acrylic monomers to produce copolymers with a more random structure.

On the addition of these copolymers to a saturated calcium bicarbonate solution with a subsequent addition of sodium hydroxide, the pH of the solution remains substantially the same and there is no precipitation. The same calcium bicarbonate solution with no copolymer added, and used as a control, during this hydroxide addition shows a drop in pH and a precipitate gradually forms. The copolymer is added in much less than the stoichiometric amounts necessary to bind the ions. In fact, as little as 1 or 2 parts per million parts of water will inhibit the precipitation of the calcium carbonates. Use of amounts greater than about 50 parts per million parts of water is usually effective but is not necessary for threshold treatments. Also, it is more economically advantageous to use the lesser amounts.

Generally, the effect of temperature is not substantial. On a rise in water temperature a slight increase in copolymer is necessary to maintain the calcium carbonate in solution. With other ions less can be used. The determining factor as to temperature is the variance of the solubility coefficient as the temperature rises. However, as a general rule, additions in the range of 5 p.p.m. to 10 p.p.m. will be effective over a wide temperature range.

The following examples are set out to further amplify the invention.

EXAMPLE 1

A reaction vessel with a cold bath to maintain the vessel at about −37° C. is assembled having an inlet for reactant addition and ports for flowing a drying gas through the vessel. 0.2 mole of diallylglycinonitrile is added to the vessel. 0.2 mole of anhydrous hydrogen chloride in diethylether is added to the vessel and maintained at −37° C. The resulting white precipitate is desolvated. Flemental and spectral analysis confirm the product as N,N-diallylglycinonitrile hydrochloride.

EXAMPLE 2

The reaction of Example 1 was carried out in the same manner but using 0.2 mole of diallylglycine. Elemental and spectral analysis confirmed the product as N,N-diallylglycine hydrochloride.

EXAMPLE 3

A reaction of Example 1 was carried out in the same manner but using 0.2 mole of diallylglycinamide. Elemental and spectral analysis confirmed the product as N,N-diallylglycinamide hydrochloride.

EXAMPLE 4

A reaction vessel equipped with a heating mantle, stirrer, condenser, thermometer and an inlet for reactant addition is assembled. 0.04 mole of N,N-diallylglycinonitrile hydrochloride in 50 ml. of water is added to the vessel. 0.09 grams of t-butylhydroperoxide is then added to this mixture. The vessel is heated to 70° C. to 80° C. with stirring, and a solution of 0.04 mole acrylic acid in 50 ml. of water is added dropwise at a rate of about 2 drops per minute. A water soluble copolymer of about 96.6% yield is formed.

EXAMPLE 5

The same apparatus as in Example 4 is used. 0.05 mole of N,N-diallylglycinamide hydrochloride in 50 ml. of water is added to the vessel. 0.10 gram of t-butylhydroperoxide is then added to this mixture. The vessel is heated to 70° C. to 80° C., the solution stirred, and a solution of 0.03 mole acrylic acid in 30 ml. of water is added dropwise over a 4 hour period. A water soluble copolymer of about 90.5% yield is formed.

EXAMPLE 6

The same apparatus in Example 4 is used. 0.04 mole of N,N-diallylglycinonitrile hydrochloride in 50 ml. of water is added to the vessel. 0.06 gram of t-butylhydroperoxide is added to this mixture. The vessel is heated to 70° C. to 80° C., the solution stirred, and 0.03 mole of acrylamide in 30 ml. of water is added dropwise over a two hour period. A water soluble copolymer is formed in 95.4% yield.

EXAMPLE 7

The same apparatus as in Example 4 is used. 0.08 mole of N,N-diallylglycine hydrochloride in 100 ml. of water is added to the vessel. 0.03 gram of t-butylhydroperoxide is then added to this mixture. The vessel is heated to 70° C. to 80° C., the solution stirred, and 0.05 mole of acrylic acid in 50 ml. of water is added dropwise over a 2 hour period. A water soluble copolymer of about 92% yield is formed.

EXAMPLE 8

A solution of calcium bicarbonate is prepared by suspending 1.23 grams of calcium carbonate in 4 liters of distilled water. Carbon dioxide is bubbled through the solution until all the carbonate is dissolved. Excess carbon dioxide is removed by bubbling air through the solution.

Two 100 ml. samples of this solution are placed in separate beakers. A 5 p.p.m. dosage of the copolymer of Example 4 is added to the first beaker. The second beaker is a control sample. 2 ml. of a 0.1 N NaOH solution is added to each beaker and the pH monitored. Beaker 2 registered a pH drop of 1.28 and a carbonate precipitate formed. Beaker 1 containing the copolymer registered only a .27 pH drop and no formation of a carbonate precipitate.

EXAMPLE 9

The calcium bicarbonate solution is prepared as in Example 8. Two 100 ml. samples of this solution are placed in separate beakers. Then an 8 p.p.m. dosage of the copolymer described in Example 5 is added to the first beaker. The second beaker is a control sample. 2 ml. of 0.1 N of NaOH solution is added to each beaker and the pH monitored. The first beaker containing the copolymer registered a pH drop of only 0.13 and no carbonate precipitate formed. The second beaker registered a 1.35 drop in pH and a carbonate precipitate formed.

I claim:
1. A copolymer of an N,N-diallylglycino hydrochloride monomer and an acrylic monomer selected from the group consisting of acrylic acid and acrylamide, said acrylic monomer being in a concentration of from 30 to 70 mole percent.

2. A copolymer as in claim 1 wherein said copolymer has a repeating sequence

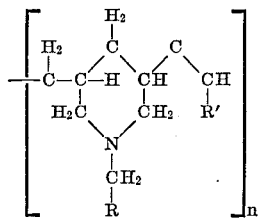

wherein R is selected from the group consisting of cyano, amido, and carboxy acid, R' is selected from the group consisting of amido and carboxy acid, and $n$ is a positive integer.

3. A copolymer as in claim 2 wherein the N,N-diallylglycino hydrochloride monomer is selected from the group consisting of N,N-diallylglycinonitrile hydrochloride, and N,N-diallylglycine hydrochloride and N,N-diallylglycinamide hydrochloride, and the acrylic monomer is selected from the group consisting of acrylic acid and acrylamide.

4. A copolymer as in claim 1 wherein the N,N-diallylglycino hydrochloride monomer is selected from the group consisting of N,N-diallylglycinonitrile hydrochloride, N,N-diallylglycine hydrochloride and N,N-diallylglycinamide hydrochloride and the acrylic monomer is selected from the group consisting of acrylic acid and acrylamide.

5. A copolymer as in claim 4 whereint he N,N-diallylglycino hydrochloride is N,N-diallylglycinonitrile hydrochloride and the acrylic monomer is acrylic acid.

6. A method of producing copolymers of an N,N-diallylglycino hydrochloride monomer and an acrylic monomer selected from the group consisting of acrylic acid and acrylamide comprising contacting said diallyglycino hydrochloride monomer with said acrylic monomer in the presence of water and a free radical catalyst, heating to an elevated temperature, and recovering the subsequently formed copolymer having an acrylic monomer content of from about 30 to 70 mole percent.

7. A method of claim 6 of producing copolymers of an N,N-diallylglycino hydrochloride monomer and an acrylic monomer having a repeating sequence

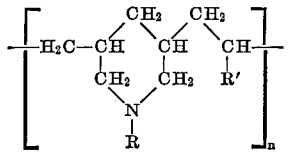

wherein R is selected from the group consisting of cyano, amido and carboxy acid, R' is selected from the group consisting of amido and carboxy acid and $n$ is a positive integer comprising contacting stoichiometric amounts of said diallylglycino hydrochloride monomer and said acrylic monomer in the presence of water and a free radical catalyst, heating to an elevated temperature, and recovering the subsequently formed copolymer.

8. A method of claim 7 of producing copolymers of an N,N-diallylglycino hydrochloride monomer and acrylic monomer wherein the N,N-diallylglycino hydrochloride monomer is selected from the group consisting of N,N-diallylglycinonitrile hydrochloride, N,N-diallylglycinamide hydrochloride, and N,N-diallylglycine hydrochloride and the acrylic monomer is selected from the group consisting of acrylic acid and acrylamide.

9. The method of claim 6 of producing copolymers of an N,N-diallylglycino hydrochloride monomer and acrylic monomer wherein the N,N-diallylglycino hydrochloride monomer is selected from the group consisting of N,N-diallylglycinonitrile hydrochoride, and N,N-diallylglycinamide hydrochloride and N,N-diallylglycine hydrochloride and the acrylic monomer is selected from the group consisting of acrylic acid and acrylamide.

10. A method of claim 6 of producing copolymers from an N,N-diallylglycino hydrochloride monomer and acrylic monomer wherein the elevated temperature is about 50° C. to about 100° C.

11. The method of treating water to prevent scaling comprising adding a copolymer of an N,N-diallylglycino hydrochloride monomer and acrylic monomer in a minor amount to an aqueous ion containing solution, this mixture inhibiting the formation of scales.

12. The method of claim 11 of treating water to prevent scaling wherein said mixture is agitated.

13. The method of clam 12 of treating water to prevent scaling wherein said copolymer is added in a ratio of from about 4 p.p.m. and to about 10 p.p.m.

14. The method of claim 12 of treating water to prevent scaling wherein said ions are calcium ions and carbonate ions.

References Cited
UNITED STATES PATENTS

| | | | |
|---|---|---|---|
| 2,550,652 | 4/1951 | Dreschel et al. | 260—85.5 |
| 3,032,539 | 5/1962 | Schuller et al. | 260—85.5 |

JOSEPH SCHOFER, Primary Examiner

S. M. LEVIN, Assistant Examiner

U.S. Cl. X.R.

260—85.5; 252—175